(12) United States Patent
Tomotsu

(10) Patent No.: US 6,696,525 B2
(45) Date of Patent: Feb. 24, 2004

(54) PROCESS FOR PRODUCING POLYMER COMPOSITION

(75) Inventor: Norio Tomotsu, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 25 days.

(21) Appl. No.: 10/182,777

(22) PCT Filed: Dec. 10, 2001

(86) PCT No.: PCT/JP01/10788
§ 371 (c)(1),
(2), (4) Date: Aug. 1, 2002

(87) PCT Pub. No.: WO02/48222
PCT Pub. Date: Jun. 20, 2002

(65) Prior Publication Data
US 2003/0027932 A1 Feb. 6, 2003

(30) Foreign Application Priority Data
Dec. 12, 2000 (JP) .......................................... 2000-376882

(51) Int. Cl.[7] .......................... C08L 25/02; C08L 35/00; C08L 39/02; C08F 2/44; C08F 257/00
(52) U.S. Cl. ........................ 525/191; 525/205; 525/206; 525/207; 525/217; 525/221; 525/222; 525/232; 525/238; 525/239; 525/240; 525/241
(58) Field of Search ..................... 525/191, 205, 525/206, 207, 217, 221, 222, 232, 238, 239, 240, 241

(56) References Cited

U.S. PATENT DOCUMENTS

| | | |
|---|---|---|
| 5,422,407 A | 6/1995 | Tomotsu et al. |
| 5,461,128 A | 10/1995 | Takeuchi et al. |
| 5,543,481 A | 8/1996 | Takeuchi et al. |
| 5,596,055 A | 1/1997 | Aoyama et al. |
| 5,623,034 A | 4/1997 | Aoyama et al. |
| 5,670,587 A | 9/1997 | Takeuchi et al. |
| 5,739,227 A | 4/1998 | Teshima et al. |
| 5,747,613 A | 5/1998 | Takeuchi et al. |
| 5,747,614 A | 5/1998 | Takeuchi et al. |
| 5,756,612 A | 5/1998 | Aoyama et al. |
| 5,786,433 A | 7/1998 | Tomotsu et al. |
| 5,807,940 A | 9/1998 | Aoyama et al. |
| 5,824,753 A | 10/1998 | Naganuma et al. |
| 5,858,904 A | 1/1999 | Takeuchi et al. |
| 5,905,126 A | 5/1999 | Tomotsu et al. |
| 5,917,073 A | 6/1999 | Kondoh et al. |
| 6,034,191 A | 3/2000 | Kondoh et al. |
| 6,075,102 A | 6/2000 | Aoyama et al. |
| 6,100,352 A | 8/2000 | Shouzaki et al. |
| RE37,064 E | 2/2001 | Aoyama et al. |
| 6,277,934 B1 | 8/2001 | Kondoh et al. |

FOREIGN PATENT DOCUMENTS

| | | |
|---|---|---|
| EP | 490269 | 6/1992 |
| JP | 2001-187804 | 7/2001 |
| WO | 00/53649 | 9/2000 |

Primary Examiner—Nathan M. Nutter
(74) Attorney, Agent, or Firm—Oblon, Spivak, McClelland, Maier & Neustadt, P.C.

(57) ABSTRACT

In the present invention, the polymer composition is produced by polymerizing an anionically or cationically polymerizable monomer in the presence of a highly syndiotactic styrenic polymer and optionally a rubber-like polymer. The polymer composition thus obtained is improved in its solvent resistance without using any particular compatibilizer and has a good moldability.

14 Claims, No Drawings

PROCESS FOR PRODUCING POLYMER COMPOSITION

TECHNICAL FIELD

The present invention relates to a method for producing a polymer composition, and more particularly to a method for producing a polymer composition by the polymerization of an anionically or cationically polymerizable monomer in the presence of a highly syndiotactic styrenic polymer (hereinafter may be referred to as "SPS").

BACKGROUND ART

Many of amorphous polymers produced by radical polymerization of an anionically or cationically polymerizable monomer are generally poor in the solvent resistance as compared with crystalline polymers. For example, atactic styrenic polymers such as general purpose polystyrene (GPPS) and high impact polystyrene (HIPS), and homopolymers of methyl methacrylate, acrylonitrile, etc. are poor in the solvent resistance, thereby limiting their use.

By copolymerizing styrene with a polar monomer such as acrylonitrile, acrylate, maleic anhydride or maleimide, the solvent resistance of styrenic polymers can be improved to some extent, but still insufficient for practical use.

It has been also attempted to copolymerize methyl methacrylate, acrylonitrile, etc. with vinyl acetate, butyl vinyl sulfone, etc. to improve the solvent resistance. However, the polymerization efficiency is poor and the improvement in the solvent resistance is still insufficient.

Since SPS is crystalline and possesses characteristics of atactic styrenic polymer simultaneously with heat resistance and solvent resistance, its use for electronic parts, electric parts, films, etc. has been developed. In addition, it has been attempted to produce a resin composition endowed with the characteristics of SPS by blending SPS with an atactic styrenic polymer or another thermoplastic resin. However, a composition blended with SPS is difficult to be produced efficiently because a blending step and a granulating step are required. In addition, the addition of a compatibilizer is needed to meet the various end uses. Further, it has been demanded to provide a composition blended with SPS in which SPS exhibits its improving effect larger than that obtained in the conventional composition prepared by physically blending SPS.

DISCLOSURE OF INVENTION

In view of the above state of the prior art, an object of the present invention is to provide a method for producing a composition of a polymer of an anionically or cationically polymerizable monomer, the composition being improved in its solvent resistance without using a particular compatibilizer and having a good moldability and a high impact strength.

As a result of extensive study for achieving the above object, the inventor has found that the objective composition of a polymer of the anionically or cationically polymerizable monomer having a solvent resistance higher than that attained by a mere physical blend of a polymer of the anionically or cationically polymerizable monomer with SPS pellet is obtained by dispersing, swelling or dissolving SPS into the anionically or cationically polymerizable monomer and then polymerizing the anionically or cationically polymerizable monomer, or alternatively, by dispersing, swelling or dissolving SPS into the anionically or cationically polymerizable monomer when dissolving a rubber-like polymer therein and then polymerizing the anionically or cationically polymerizable monomer. The present invention has been accomplished on the basis of this finding.

Thus, the present invention provides a method for producing a polymer composition, which comprises a step of polymerizing an anionically or cationically polymerizable monomer in the presence of a highly syndiotactic styrenic polymer.

The present invention further provides a method for producing a polymer composition, which comprises a step of polymerizing an anionically or cationically polymerizable monomer in the presence of, if desired, a highly syndiotactic styrenic polymer and a rubber-like polymer.

BEST MODE FOR CARRYING OUT THE INVENTION

In the present invention, by "polymer composition" is meant a composition comprising a polymer of the anionically or cationically polymerizable monomer (hereinafter may be referred to as "starting monomer"), SPS, and optionally a rubber-like polymer; a composition comprising a copolymer of the starting monomer with SPS and optionally the rubber-like polymer; a composition comprising the copolymer, SPS and optionally the rubber-like polymer; a composition comprising the copolymer and the polymer of the starting monomer; and a composition comprising the copolymer, SPS, the starting monomer and optionally the rubber-like polymer. With these polymer compositions, an improving effect due to SPS which is higher than that obtained by a mere physical blend of SPS is attained.

The starting monomer (anionically or cationically polymerizable monomer) usable in the present invention is an aromatic vinyl monomer, methacrylic acid, acrylonitrile, vinyl chloride, etc. The aromatic vinyl monomer is represented by the following formula 1:

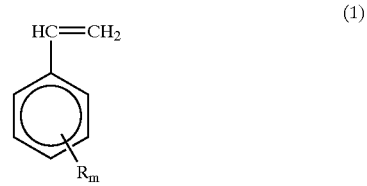

(1)

wherein R is halogen atom or a substituent group containing at least one atom selected from the group consisting of carbon atom, oxygen atom, nitrogen atom, sulfur atom, phosphorus atom, selenium atom, tin atom, and silicon atom, m is an integer of 0 to 3, and each of R groups may be the same or different when m is 2 or 3. Examples of preferred aromatic vinyl compound include styrene, alkyl styrene such as α-methylstyrene, methylstyrene, ethylstyrene, isopropylstyrene, and tert-butylstyrene, phenylstyrene, divinylbenzene, vinylethylbenzene, vinylxylene, vinylnaphthalene, chlorostyrene, bromostyrene, fluorostyrene, chloromethylstyrene, methoxystyrene, ethoxystyrene, and tert-butoxystyrene.

In addition to the anionically or cationically polymerizable monomer, another vinyl monomer copolymerizable with these starting monomer may be used. Examples of such another vinyl monomer include a vinyl cyanide compound such as acrylonitrile and methacrylonitrile; an acrylic ester such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, and benzyl acrylate; maleic acid and its derivative such as maleic anhydride, maleic ester, and maleic salt; fumaric acid and its derivative such as fumaric ester and fumaric salt; itaconic acid and its derivative such as itaconic anhydride, itaconic ester and itaconic salt; acrylic acid and its derivative such as acrylic amide and acrylic salt; a methacrylic ester such as methyl methacrylate, ethyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, and benzyl methacrylate; maleimide and a N-substituted maleimide such as N-methylmaleimide, N-ethylmaleimide, N-butylmaleimide, N-laurylmaleimide, N-cyclohexylmaleimide, N-phenylmaleimide, and N-(p-bromophenyl)maleimide; and a halogenated vinyl monomer.

The rubber-like polymer usable in the present invention may include natural rubber, polyisoprene, polyisobutylene, neoprene, polysulfide rubber, thiol rubber, acrylic rubber, urethane rubber, silicone rubber, epichlorohydrin rubber, styrene-butadiene block copolymer (SBR), hydrogenated styrene-butadiene block copolymer (SEB, SEBC), styrene-butadiene-styrene block copolymer (SBS), hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene-propylene rubber (EPM), ethylene-propylene-diene rubber (EPDM), and a core-shell type granular elastomer such as butadiene-acrylonitrile-styrene core-shell rubber (ABS), methyl methacrylate-butadiene-styrene core-shell rubber (MBS), methyl methacrylate-butyl acrylate-styrene core-shell rubber (MAS), octyl acrylate-butadiene-styrene core-shell rubber (MABS), alkyl acrylate-butadiene-acrylonitrile-styrene core-shell rubber (AABS), butadiene-styrene core-shell rubber (SBR), and siloxane-containing core-shell rubber such as methyl methacrylate-butyl acrylate-siloxane. The rubber-like polymer preferably comprises 90% by weight or more of polybutadiene rubber, styrene-butadiene rubber, or a mixture thereof.

Polybutadiene rubber may be a low-cis polybutadiene, a high-cis polybutadiene, or a mixture thereof.

Styrene-butadiene rubber may be a random copolymer, a block copolymer, a tapered copolymer or any mixture thereof, each copolymer having a styrene content of 2 to 40% by weight. Modified products of the above rubbers are also usable. Of the above rubber-like polymers, preferred are SBR, SBS, SEB, SEBS, SIR, SEP, SIS, SEPS, core-shell rubbers, EPM, EPDM, and modified products thereof. These rubbers may be used alone or in combination of two or more.

The styrenic polymer usable in the present invention is highly syndiotactic. The syndiotactic structure is a stereochemical configuration in which the phenyl side chains attached to a polymer backbone constituted by carbon—carbon linkages lie on alternate sides of the polymer backbone. The syndiotacticity representing the degree of syndiotactic configuration is determined by isotopic carbon nuclear magnetic resonance ($^{13}$C-NMR).

The tacticity obtained from $^{13}$C-NMR data can be described by the percentage of successive plural constitutional units, for example, dyad for two successive units, triad for three successive units, and pentad for five successive units. In the present invention, the highly syndiotactic styrenic polymers are those having a syndiotacticity represented by 75% or more, preferably 85% or more racemic dyad, or 30% or more, preferably 50% or more racemic pentad.

As such a highly syndiotactic styrenic polymer, usable are, for example, polystyrene, poly(hydrocarbylstyrene), poly(halogenated styrene), poly(halogenated alkylstyrene), poly(alkoxystyrene), poly(vinyl benzoate), divinylbenzene copolymer and copolymers mainly comprising monomers of aforesaid polymers.

Examples of poly(hydrocarbylstyrene) include poly(methylstyrene), poly(ethylstyrene), poly(isopropylstyrene), poly(tert-butylstyrene), poly(phenylstyrene), poly(vinylnaphthalene) and poly(vinylstyrene). Examples of poly(halogenated styrene) include poly(chlorostyrene), poly(bromostyrene) and poly(fluorostyrene). Examples of poly(halogenated alkylstyrene) include poly(chloromethylstyrene). Examples of poly(alkoxystyrene) include poly(methoxystyrene) and poly(ethoxystyrene). Particularly preferred styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene) and copolymers of styrene and a monomer of the above polymers.

The highly syndiotactic styrenic polymer can be produced by a known method. For example, a styrenic monomer (monomer of the above styrenic polymer) is polymerized in an inert hydrocarbon solvent or in the absence of solvent using a titanium compound and a condensate of water and trialkylaluminum as a catalyst (Japanese Patent Application Laid-Open No. 62-187708). Poly(halogenated alkylstyrene) and its hydrogenated products can be also produced by a known method as disclosed in Japanese Patent Application Laid-Open Nos. 1-46912 and 1-178505. In the present invention, the weight average molecular weight (Mw) of the highly syndiotactic styrenic polymer is 2,000,000 or less, preferably 1,000,000 or less, and more preferably 500,000 or less. The molecular weight distribution (weight average molecular weight (Mw)/number average molecular weight (Mn)) is 4.0 or less, preferably 3.5 or less, and more preferably 3.0 or less. The lower limit of the molecular weight distribution is not critical in the present invention.

SPS usable in the present invention may be granulated or may be in the form of powder containing styrene monomer remaining after polymerization.

In the method omitting the use of the optional rubber-like polymer, the use amount of the starting monomer (anionically or cationically polymerizable monomer) is 30 to 99% by weight, preferably 50 to 98% by weight, and more preferably 60 to 98% by weight based on the starting mixture (total of the starting monomer and SPS). The use amount of SPS is 70 to 1% by weight, preferably 50 to 2% by weight, and more preferably 40 to 2% by weight based on the starting mixture. When the amount of SPS is less than 2% by weight, the improving effect on the solvent resistance is not obtained. When exceeding 70% by weight, the SPS content of the composition becomes so high to prevent the advantage of the resultant polymer from being exhibited sufficiently, thereby deteriorating properties of the composition.

In the method of using the rubber-like polymer, the total use amount of the starting monomer and the rubber-like polymer is 30 to 99% by weight, preferably 50 to 98% by weight, and more preferably 60 to 98% by weight based on the starting mixture (total of the starting monomer, the rubber-like polymer and SPS). The use amount of SPS is 70 to 1% by weight, preferably 50 to 2% by weight, and more preferably 40 to 2% by weight based on the starting solution. When the amount of SPS is less than 2% by weight, the improving effect on the solvent resistance is not obtained. When exceeding 70% by weight, the dispersion of SPS throughout the composition is insufficient, thereby deteriorating properties of the composition. The compounding amount of the starting monomer is 1% by weight or more, preferably 30% by weight or more, and more preferably 50% by weight or more based on the total of the starting monomer and the rubber-like polymer. When the compounding amount is less than 1% by weight, the polymerization is liable to fail to proceed smoothly. In addition, a large proportion of the rubber-like polymer tends to make the resultant composition poor in the solvent resistance. More preferably, the compounding amounts of the starting monomer, SPS and the rubber-like polymer are respectively 40 to 96% by weight, 30 to 2% by weight and 30 to 2% by weight based on the starting mixture.

In the present invention, the anionically or cationically polymerizable monomer is preferably polymerized by a thermal polymerization or a radical polymerization, although not particularly limited thereto. Examples of the radical generator used in the radical polymerization include benzoyl peroxide, di-tert-butyl peroxide, dicumyl peroxide, tert-butyl peroxybenzoate, azobisisobutyronitrile, azobisisovaleronitrile, 2,3-diphenyl-2,3-dimethylbutane.

Polymerization temperature, polymerization time, polymerization pressure are suitably adjusted according to the type of the anionically or cationically polymerizable monomer to be used. Preferably, the polymerization temperature is 60 to 200° C., the polymerization time is 0.1 to 100 h, and the polymerization pressure is 10 Pa or below in either case where the rubber-like polymer is used or not used.

The starting mixture may be added, if desired, with an organic peroxide as a polymerization initiator, a chain transfer agent, a mineral oil, a silicone oil, etc. After the polymerization is completed, the polymerization product is deaerated by conventional procedure and granulated.

The present invention will be described in further detail by way of the following examples which should not be construed to limit the scope of the present invention.

Evaluation Methods (1) Melt index (MI) Measured at 230° C. under a load of 21.2 N according to JIS K 7210.

(2) Impact Strength (Notched)

Measured according to JIS K 7110.

(3) Solvent Resistance (I) Measurement was made by using a surfactant (Bath Magicline, trade name of Kao Corporation), a soybean oil and MCT oil (Acter MI, trade name of Riken Vitamin Co., Ltd.) as the stress-cracking solvent. More specifically, a specimen was fixed on the round surface of a 0.8% bending strain jig. After laying a gauze on the round surface of the fixed specimen, the solvent was dropped so as to soak into the entire portions of gauze. The specimen thus treated was allowed to stand for one hour at 80° C. in an oven when treated with the surfactant or the soybean oil, or for one hour at room temperature when treated with MCT oil. Thereafter, change in the appearance of the specimen was visually observed. The results were ranked by the following ratings:

A: No change was observed.

B: Substantially no change was observed.

C: Slight crazing occurred.

D: Cracking or breaking occurred.

(II) Change in the appearance after the specimen was immersed in Fron 141B for one hour at room temperature was visually observed. The results were ranked according to the same ratings as above.

SPS used in the following examples and comparative examples are shown below.

SPS1: Styrene homopolymer
Weight average molecular weight Mw 180,000
Mw/Mn=2.6, Meting point=270° C.

SPS 2 Styrene-p-methylstyrene copolymer
p-Methylstyrene content=12 mol %
Weight average molecular weight Mw=180,000
Mw/Mn=2.6, Meting point=240° C.

SPS 3: Styrene homopolymer
Weight average molecular weight Mw=300,000
Mw/Mn=2.9, Meting point=270° C.

SPS 4: Styrene-divinyl benzene copolymer
Divinyl benzene content=0.1 mol %
Weight average molecular weight Mw=200,000
Mw/Mn=2.9, Meting point=270° C.

Into a 5-L complete stirring-mixing tank type preheater, were continuously fed 100 parts by weight a mixed solution consisting of 82 parts by weight of styrene, 8 parts by weight of a low-cis polybutadiene and 10 parts by weight of SPS1 at a feeding rate of 30 L/h. The SV value (viscosity of a 5 wt % styrene solution at 25° C.) of the low-cis polybutadiene was 85 mPa·s. After pre-heating to 100° C., the resultant mixture was continuously fed into a first reactor (a tower type plug flow reactor equipped with a stirrer) and allowed to polymerize there. The polymerization temperature in the first reactor was controlled so as to generate a temperature gradient increasing toward the flow direction in the range of 100 to 120° C. The polymerization conversion of styrene based on the charged styrene was 2.1% at the outlet of the preheater, and the rubber-like polymer did not cause phase inversion. After the polymerization was proceeded under stirring in the first reactor, the phase inversion of the polymerization liquid was completed when measured at the outlet of the first reactor. The polymerization was further continued by feeding the polymerization liquid from the first reactor continuously to a second reactor which was constructed by three 50-L static mixer type plug flow reactors connected in series. The polymerization was continued until the polymerization conversion of styrene reached 88%. The resultant polymerization liquid was heat-treated at 230° C. in a three-vent twin screw extruder while removing volatile components under reduced pressure, and then pelletized. Properties of the resin thus obtained are shown in Table 1.

EXAMPLE 2

Resin pellets were prepared in the same manner as in Example 1 except for using SPS2 in place of SPS1. Properties of the resin thus obtained are shown in Table 1.

EXAMPLE 3

Resin pellets were prepared in the same manner as in Example 1 except for using SPS3 in place of SPS1. Properties of the resin thus obtained are shown in Table 1.

EXAMPLE 4

Resin pellets were prepared in the same manner as in Example 1 except for using SPS4 in place of SPS1. Properties of the resin thus obtained are shown in Table 1.

EXAMPLE 5

Resin pellets were prepared in the same manner as in Example 1 except for using styrene in an amount of 87 parts by weight in stead of 82 parts by weight, the low-cis polybutadiene (SV value: 85 mPa·s) in an amount of 9 parts by weight in stead of 8 parts by weight, and 4 parts by weight of SPS4 in stead of 10 parts by weight of SPS1. Properties of the resin thus obtained are shown in Table 1.

Comparative Example 1

Resin pellets were prepared in the same manner as in Example 1 except for using styrene in an amount of 91 parts by weight in stead of 82 parts by weight, the low-cis polybutadiene (SV value: 85 mPa·s) in an amount of 9 parts by weight in stead of 8 parts by weight, and omitting the use of SPS1. Properties of the resin thus obtained are shown in Table 1.

Comparative Example 2

A mixture prepared by dry-blending 90% by weight of a high impact polystyrene (HIPS) (HT52, trade name of Idemitsu Petrochemical Co., Ltd.) and 10% by weight of SPS1 in Henschel mixer was melt-kneaded in a twin screw extruder and pelletized at a resin temperature of 280° C. The pellets thus prepared were injection-molded into Izod test specimens and bending test specimens (used as specimens for solvent resistance test) at a resin temperature of 280° C. and a mold temperature of 60° C. The results the Izod impact test and the solvent resistance test are shown in Table 1.

TABLE 1

|  | MI (g/10 min) | Impact strength (notched) (kJ/m$^2$) | Solvent resistance I | Solvent resistance II |
|---|---|---|---|---|
| Examples |  |  |  |  |
| 1 | 2.2 | 11.5 | A | A |
| 2 | 2.1 | 12.1 | A | A |
| 3 | 1.8 | 12.0 | A | A |
| 4 | 2.4 | 13.7 | A | A |
| 5 | 2.6 | 11.4 | A | A |
| Comparative Examples |  |  |  |  |
| 1 | 2.4 | 11.9 | D | D |
| 2 | 2.2 | 12.4 | B | B |

EFFECT OF THE INVENTION

The present invention provides a composition of polymer of an anionically or cationically polymerizable monomer, which is improved in the solvent resistance without using any particular compatibilizer and has a good moldability and, if a rubber-like polymer is used, a high impact strength.

What is claimed is:

1. A method for producing a polymer composition, which comprises a step of polymerizing an anionically or cationically polymerizable monomer in the presence of a highly syndiotactic styrenic polymer.

2. The method according to claim 1, wherein the anionically or cationically polymerizable monomer is an aromatic monovinyl monomer represented by the following formula 1:

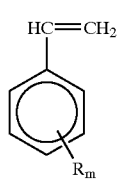

(1)

wherein r is halogen atom or a substituent group containing at least one atom selected from the group consisting of carbon atom, oxygen atom, nitrogen atom, sulfur atom, phosphorus atom, selenium atom, tin atom, and silicon atom, m is an integer of 0 to 3, and each of r groups may be the same or different when m is 2 or 3.

3. The method according to claim 2, wherein the aromatic monovinyl monomer is at least one compound selected from the group consisting of styrene, alkyl styrene such as α-methylstyrene, methylstyrene, ethylstyrene, isopropylstyrene, and tert-butylstyrene, phenylstyrene, divinylbenzene, vinylethylbenzene, vinylxylene, vinylnaphthalene, chlorostyrene, bromostyrene, fluorostyrene, chloromethylstyrene, methoxystyrene, ethoxystyrene, and tert-butoxystyrene.

4. The method according to claim 1, wherein the highly syndiotactic styrenic polymer is a styrene homopolymer, a copolymer of an alkylstyrene and styrene, or a copolymer of vinylstyrene and stryrene.

5. The method according to claim 1, wherein the polymerization of the anionically or cationically polymerizable monomer is carried out by heating 100 parts by weight of a starting mixture comprising 30 to 99 parts by weight of the anionically or cationically polymerizable monomer and 70 to 1 part by weight of the highly syndiotactic styrenic polymer to 60 to 200° C.

6. The method according to claim 1, wherein the polymerization of the anionically or cationically polymerizable monomer is carried out in the presence of a radical generator.

7. A method for producing a polymer composition, which comprises a step of polymerizing an anionically or cationically polymerizable monomer in the presence of a highly syndiotactic styrenic polymer and a rubber-like polymer.

8. The method according to claim 7, wherein the anionically or cationically polymerizable monomer is an aromatic monovinyl monomer represented by the following formula 1:

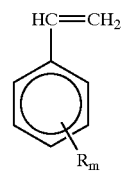

(1)

wherein R is halogen atom or a substituent group containing at least one atom selected from the group consisting of carbon atom, oxygen atom, nitrogen atom, sulfur atom, phosphorus atom, selenium atom, tin atom, and silicon atom, m is an integer of 0 to 3, and each of R groups may be the same or different when m is 2 or 3.

9. The method according to claim 8, wherein the aromatic monovinyl monomer is at least one compound selected from the group consisting of styrene, alkyl styrene such as α-methylstyrene, methylstyrene, ethylstyrene, isopropylstyrene, and tert-butylstyrene, phenylstyrene, divinylbenzene, vinylethylbenzene, vinylxylene, vinylnaphthalene, chlorostyrene, bromostyrene, fluorostyrene, chloromethylstyrene, methoxystyrene, ethoxystyrene, and tert-butoxystyrene.

10. The method according to claim 7, wherein the highly syndiotactic styrenic polymer is a styrene homopolymer, a copolymer of an alkylstyrene and styrene, or a copolymer of vinylstyrene and stryrene.

11. The method according to claim 7, wherein the polymerization of the anionically or cationically polymerizable monomer is carried out by the heating 100 parts by weight of a starting mixture comprising 30 to 99 parts by weight of the anionically or cationically polymerizable monomer and the rubber-like polymer in total and 70 to 1 part by weight of the highly syndiotactic styrenic polymer to 60 to 200° C.

12. The method according to claim 11, wherein the compounding amount of the anionically or cationically polymerizable monomer is 1% by weight or more of the total amount of the anionically or cationically polymerizable monomer and the rubber-like polymer.

13. The method according to claim 11, wherein the polymerization is carried out by heating a starting mixture comprising 40 to 96% by weight of the anionically or cationically polymerizable monomer, 30 to 2% by weight of the highly syndiotactic styrenic polymer and 30 to 2% by weight of the rubber-like polymer.

14. The method according to claim 7, wherein the polymerization of the anionically or cationically polymerizable monomer is carried out in the presence of a radical generator.

* * * * *